A. J. VANDEGRIFT.
Grain Separator.
No. 20,522.
Patented June 8, 1858.
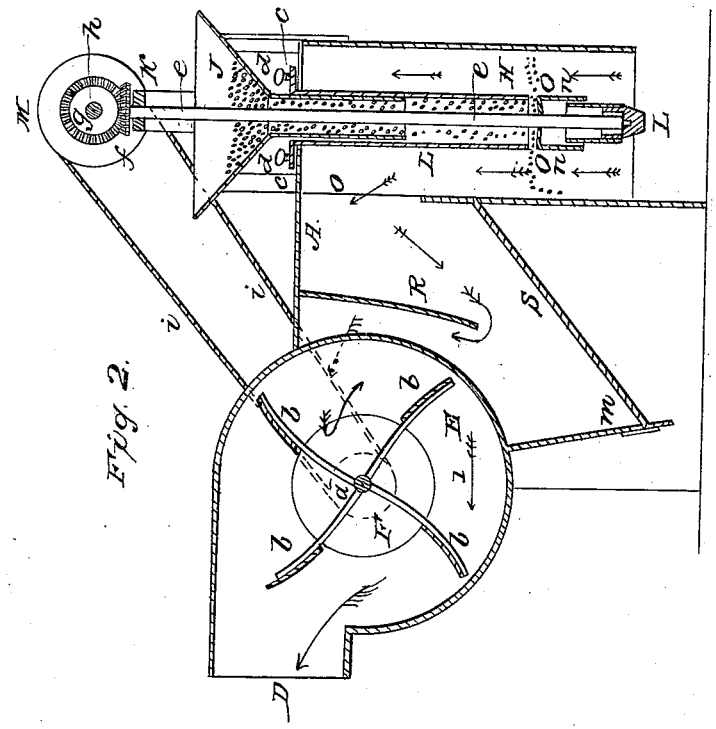
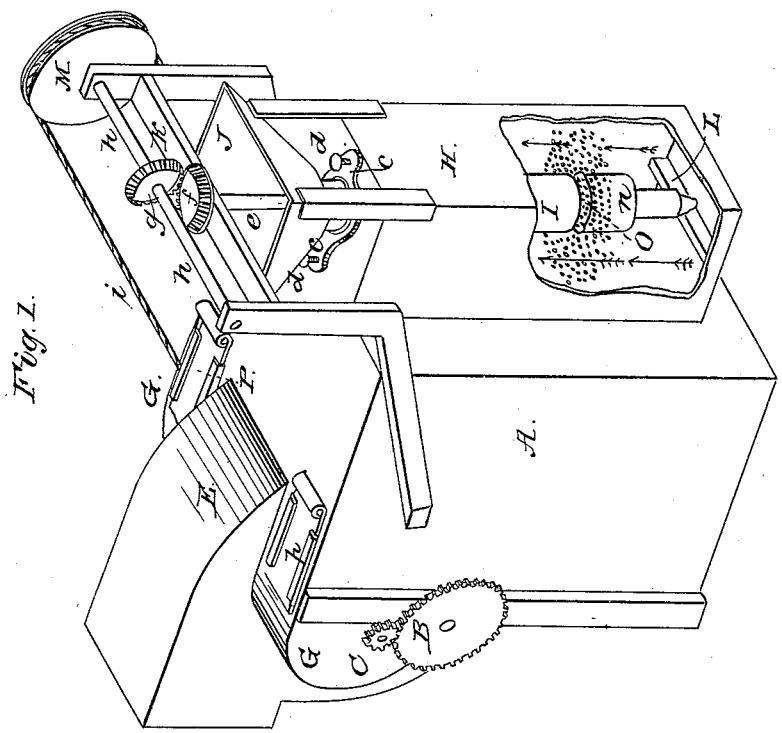

UNITED STATES PATENT OFFICE.

A. J. VANDEGRIFT, OF LEXINGTON, KENTUCKY.

GRAIN-SEPARATOR.

Specification of Letters Patent No. 20,522, dated June 8, 1858.

*To all whom it may concern:*

Be it known that I, ANDREW J. VANDEGRIFT, of Lexington, in the county of Fayette and State of Kentucky, have invented certain new and useful Improvements in Machines for Cleaning and Separating Grain of Any Kind from Its Impurities; and I do hereby declare the following to be a full, clear, and exact description of the construction and operation of the same, reference being had to the accompanying drawings, making a part of this specification, in which—

Figure 1, represents a perspective view of one of the machines arranged for being driven by hand. Fig. 2, represents a vertical longitudinal section through the same.

Similar letters of reference where they occur in the separate figures denote like parts of the apparatus in each of them.

My invention relates to that class of machines, for cleaning and separating grain from its impurities or the light from the heavy grain, in which the blast or current of air is drawn through the machine by the fan blower, instead of forced through ahead of the fan, or in other words the fan is an exhauster of the air in the machine. This class of machines as heretofore constructed, was imperfect in one essential point viz: the feeding in of the grain. It was done by allowing the grain to run down an inclined spout, placed near the bottom of air flue or trunk and thence into the trunk. The velocity which the grains acquired in running down the incline, made it difficult for the uprushing current of air to arrest them—and the heavier grains striking against the lighter ones caused the latter to fall and mix with the former, instead of being separated from them. My object is to avoid this defect in the feeding in of the grain, for it is a defect whether the grain be allowed so to enter the wind trunk higher up or lower down, both of which plans have been tried but without accomplishing as perfect separating as I do, by my mode.

The nature of my invention consists in delivering the seeds or grains to the blast, by the centrifugal action of a revolving disk or dish placed in the wind trunk, so that the seeds or grains shall be thrown out horizotally in a thin sheet across the blast and the unbroken ascending current take the lighter grains immediately from the heavier ones, and thus separate, and allow each to go to their special exit, as will be shown hereafter.

To enable others skilled in the art to make and use my invention, I will proceed to describe the same with reference to the drawings.

A, represents the outside case of the machine. B, is a gear wheel, which may be turned by hand, or by a band and pulley, or in any other well known way. This gear B, takes into, and turns a pinion C, on the journal of the fan shaft $a$, and thus gives motion to the fan blower, which has curved wings $b$, and runs in the direction shown by the arrow 1, so as to draw a current of air through the machine, and drive it out at D. The fan blower runs in a case E, which is closed up except at the eyes F, at each end of the fan, the current of air drawn through the machine first passing through air ducts G, at the ends of the fan case, and thence through the eyes F, and to the exit D.

At the rear of the machine there is a vertical wind trunk or flue H, which is open at its lower end, but otherwise closed up except that it forms with the machine itself a portion of the air passage through which the blast travels as will be explained in the operation of the machine. Through the center of the wind trunk or flue H, passes a feeding tube I, which rests by its flanges $c, c$, on the top of the flue H, and by means of set screws $d, d$, passing through said flanges this tube may be raised or lowered at pleasure to regulate the feeding in of the grain. The lower end of the tube I, is above the bottom of the wind trunk as shown in Fig. 2, and in its upper end is placed a hopper J, into which the seed or grain that is to be acted upon is placed.

Two bridge-trees K, L, one above, and the other at or near the bottom of the wind trunk, form bearings or supports for a shaft $e$ that passes down through the feeding tube I. On the upper end of the shaft $e$, there is a bevel pinion $f$, which receives motion from a similar bevel gear $g$, on the shaft $h$, said shaft $h$, in turn receiving its motions from the fan shaft $a$ by means of an endless belt or band $i$ passing around the pulleys M, N, respectively on said shafts.

Near the bottom of the shaft $e$, is placed a disk, cup, or concave O, it being just below the bottom of the feeding tube I; this disk, cup, or concave, which may be termed a "distributer," receives the grain that passes through the feeding tube, and being rotated by the parts heretofore described, or by any other mechanical equivalents, throws the grain off by centrifugal force, through the space between the bottom of the feeding tube, and the top of said distributer—which space as heretofore stated can be regulated by the set screws $d$, $d$. The seeds or grain thus thrown off pass in a thin sheet across or at right angles to the ascending current of air through the wind trunk—the lighter particles or grains, as well as the impurities being carried up with the blast, while the heavier grains fall by their greater specific gravity down through the wind trunk. By thus throwing off horizontally across the blast the seeds or grain—the heavy grains do not strike, and carry down with them the lighter ones which is invariably the effect, when they are fed in, in the ordinary way. The separation of the light from the heavier products, takes place, when the grain or seeds are thrown across the blast, there being a momentary cessation of motion, as the momentum of the grain thus thrown from the distributer, gives way to the superior force of the ascending column of air, and while at this almost apparent state of rest, the heavier products fall by their gravitation, while the lighter ones pass upward with the blast. To regulate this blast so as to perfectly separate according to their specific gravities, I arrange openings in the case, which are covered by slides P, P, so that, if heavier grain is passing up, over and through the machine than is desirable, air may be supplied to the fan from these openings, and consequently the volume passing up through the wind trunk will have less force, and thus only carry up lighter products. The hopper, or feeding tube I, should be kept full of grain, so that no air can pass through said tube. The blast should come through the wind trunk alone, unless as above stated, it is to be lessened when too strong and the slides P, or one of them, drawn back to open the air inlet below them. The heavy seed or grain immediately drops downward. The lighter seeds or grains, and the impurities pass up the wind trunk, as shown by the arrows, through the opening Q. The heaviest of these lighter products will strike against the upper part of the case A, or going still farther be thrown against the board R, and their momentum being thus lost or destroyed they fall upon the inclined board S, and thence pass to the exit opening $m$. The smut-chaff, dust, and other impurities, being still lighter pass on with the current of air, as shown by the arrows, to the sides of fan case E, and thence through the passages G, G, into the eyes F, of the fan case, and out of the exit D. I have thus described the construction and operation of a hand machine working upon this principle of course larger machines for grinding mills may be made and used as power machines, and the grains may be subjected to a beating apparatus to remove the smut from them before they are subjected to the separating and cleaning devices. But so long as the grain is thrown by centrifugal or other equivalent force, in thin sheets across the ascending blast by and under an arrangement of mechanism such as described so that the separation may take place without allowing the heavier products to knock or crowd down the lighter ones and without producing broken or counter currents in the wind trunk H, I should consider it as embracing my invention, for it can be equally applied to such separators as agriculturists use, or to such as millers use.

The cylinder $n$, below the distributer O, is intended, to prevent a counter current, or eddy below the distributer, it being important in perfect separation, not to allow the ascending column of air which in effect weighs all the particles it carries over and out, to be impeded by any thing which would create eddies, or counter currents and thus defeat its object.

Having thus fully described the nature and object of my invention what I claim therein as new and desire to secure by Letters Patent is—

The arrangement of the adjustable feeding tube I, and distributer O, within the wind trunk H, so that the grain may be fed in without allowing a draft or current of air to follow it, and so that the grains may be presented to the blast in thin sheets, and not have their gravitation affected by counter currents or eddies, or accelerated by falling upon each other or sliding down from above, substantially in the manner, and for the purpose set forth.

A. J. VANDEGRIFT.

Witnesses:
A. B. STOUGHTON,
E. COHEN.